Oct. 23, 1962  R. G. DUNN ET AL  3,059,294
APPARATUS FOR MAKING FOUNDRY CORES AND MOLDS
Filed May 4, 1959  5 Sheets-Sheet 3

INVENTORS
Robert G. Dunn &
BY Thomas B. Pfaff
Peter P. Kozak
ATTORNEY

Oct. 23, 1962 R. G. DUNN ET AL 3,059,294
APPARATUS FOR MAKING FOUNDRY CORES AND MOLDS
Filed May 4, 1959 5 Sheets-Sheet 4

INVENTORS
Robert G. Dunn, &
BY Thomas B. Pfaff
Peter P. Kozak
ATTORNEY

Oct. 23, 1962    R. G. DUNN ET AL    3,059,294
APPARATUS FOR MAKING FOUNDRY CORES AND MOLDS
Filed May 4, 1959    5 Sheets-Sheet 5

INVENTORS
Robert G. Dunn &
Thomas B. Pfaff
BY Peter P. Kozak
ATTORNEY

United States Patent Office 3,059,294
Patented Oct. 23, 1962

3,059,294
APPARATUS FOR MAKING FOUNDRY CORES AND MOLDS
Robert G. Dunn, Birmingham, and Thomas B. Pfaff, Auburn Heights, Mich., assignors to General Motors Corporation, Detroit, Mich., a corporation of Delaware
Filed May 4, 1959, Ser. No. 810,852
8 Claims. (Cl. 22—10)

This invention relates to apparatus for use in the manufacture of foundry molds and cores and in particular to apparatus for use in a process in which an acid gas catalyst is utilized for curing the resin binder of a sand-resin mixtuer of which the mold or core is to be formed.

The patent application Serial No. 762,120, filed September 19, 1958, now Patent 3,008,205 issued Nov. 14, 1961, and assigned to the assignee of the present invention, discloses a process for making foundry molds and cores. In general this process involves preparing a sand-resin mixture containing a major proportion of sand and a minor proportion of an acid gas curable, thermosetting, synthetic resin binder, forming a core or mold of this sand-resin mixture, and thereafter in passing an acid gas through the formed core or mold to cure the resin and bind the sand particles to one another.

The binder for the sand may be any organic material which may be mixed with sand to provide it wtih the necessary strength and which will cure under the influence of an acid gas atmosphere. In order for the binder to be properly catalyzed by the acid gas, it should be in a liquid condition. Satisfactory results may be obtained in some instances with normally solid binder constituents if they are caused to be liquid or partially liquid prior to exposure to the acid gas catalyst. The binder constituents which may be mixed with sand and subsequently caused to polymerize by the acid gas include furfuryl alcohol, furfuryl alcohol resin and other furfurylated materials which will cure in the presence of an acid gas. Various other resins and resinous materials such as novolak, resole, and acid gas curable urea-formaldehyde, melamine-formaldehyde and phenol-formaldehyde resins may also be employed.

The acid gas catalyst to be used to treat the molding mixture must be acidic or capable of forming an acid in the chemical environment of the molding mixture. Examples of suitable acid compounds which are normally gaseous or which may be made gaseous to practice the present invention include hydrogen chloride, chlorine, aluminum chloride, boron trifluoride, aluminum bromide, hydrogen bromide and the like. In general the gaseous acidic catalyst to be used consists of the Lewis-type acid gases which are proton donors. Hydrogen chloride gas and chlorine gas which are preferred for use in the process are proton donors in the presence of moisture or certain liquid binder constituents such as furfuryl alcohol. These gases are effective in causing various synthetic resin materials of the type mentioned above to condense or polymerize to produce high molecular weight polymers which are infusible and insoluble.

An example of a suitable sand-resin mix for use in the process consists of 1% to 5% by weight of furfuryl alcohol and the balance substantially sand. Other suitable comminuted refractory substances may be employed such as silica flour or other similar fine-facing materials to provide molds or cores with exceptionally smooth working surfaces. Another example of a suitable sand-resin mix includes 100 parts of foundry sand and 3 parts of a binder including 60% formaldehyde, 25% urea, 15% water, .3% methanol and no formic acid. The sand-resin mixture may be formed by merely mixing the constituents together to thoroughly distribute the binder through the sand particles. The binders in these mixes may be efficiently and suitably cured by acid gases such as hydrogen chloride gas or chlorine gas.

After the molds or cores have been formed and cured by exposure to the acid gas, they are preferably purged of the acid gas by means of an air blast and the residual acid gas is neutralized by exposure of the core or mold to an acid neutralizing gas such as ammonia.

It is the basic object of the present invention to provide apparatus for efficiently and economically producing foundry cores and molds utilizing the process described above. It is a further object of this invention to provide a two-part core or mold box and means for blowing an acid gas curable sand-resin mixture into the cavity of the core box which is constructed in a manner such that only the core box cavity is filled with the sand-resin mix, and the sand-resin mix may be directly cured within the core box cavity to form a finished core or mold. It is a further object of this invention to provide a core box having intake openings and wall openings in a wall thereof for use in a process in which the core box is successively associated with means for blowing a sand-resin mixture into the core box cavity, with means for passing an acid gas through the sand-resin mix within the cavity and with means for neutralizing the residual acid gas contained in the core material without opening the core box.

Yet another object of the invention is to provide apparatus for passing an acid gas through the sand-resin mix contained within a core box cavity whereby the core box cavity is first subjected to a vacuum to evacuate the air from the cavity and the sand-resin article formed therein, then an acid gas is passed through the formed sand-resin article within the cavity and then the cavity and the cured sand-resin article are purged of the acid gas, and this acid gas is recovered.

These and other objects are accomplished by providing apparatus having essentially a sand-resin mix blowing station, a gasifying station, an acid gas neutralizing station and a core ejection station. A two-part core box having an intake opening and a vent opening through a wall of one part thereof is placed on a conveyer means which successively passes the core box through the above-mentioned stations. The sand-resin mix blowing station includes an exhaust conduit or nozzle which extends through the intake opening of the core box and insures that no residual sand-resin mix will extend through said opening. The gasifying station includes nozzle means insertable in the intake opening of the core box for admitting an acid gas to the core box cavity under pressure and a vacuum conduit associated with the vent opening in the core box for withdrawing air and acid gas from the core box cavity.

The gasifying station further includes a vacuum pump having its intake opening connected to the core box vent in fluid-flow-relation, a surge tank connected across the exhaust opening of the vacuum pump and the core box intake opening in fluid-flow-relationship, an acid gas supply pressure tank connected to the surge tank, a first vent to the atmosphere connected between the surge tank and the core box, a second vent to the atmosphere connected between the vacuum pump and the surge tank, and valve means whereby successively the vacuum pump is operative to evacuate air from the sand-resin article formed in the core box cavity, to circulate the acid gas through the article in the core box cavity, to purge the core box of the acid gas and to pass air through the core box to further remove remaining acid gas therefrom.

The acid gas neutralizing station includes nozzle means for insertion into the intake opening of the core box and vacuum means associated with the vent openings of the core box for passing ammonia gas through the core material to neutralize residual acid gas remaining therein. The core ejection station includes means for opening the core box and ejecting the cured core or mold therefrom. The apparatus thus accomplishes the steps of blowing the sand-resin mix into a core box cavity, passing an acid gas through the sand-resin mixture within the cavity and neutralizing the residual acid gas within the core box cavity without expelling any deleterious substances to the atmosphere surrounding the apparatus and efficiently and economically manufacturing core or mold parts.

Other objects and advantages of this invention will more fully appear from the following description of a preferred embodiment of the invention shown in the accompanying drawings, in which.

It will be understood that in the following detailed description of the apparatus and its mode of operation in the process of manufacture of cores or molds, the term "mold" is used in a generic sense to mean a casting form which includes both molds and cores. For the sake of simplicity, the apparatus is described in terms of the manufacture of a core of generally rectangular shape although it will be obvious that both molds and cores of various shapes may be made by a suitable modification of the core box cavity.

Figure 1:
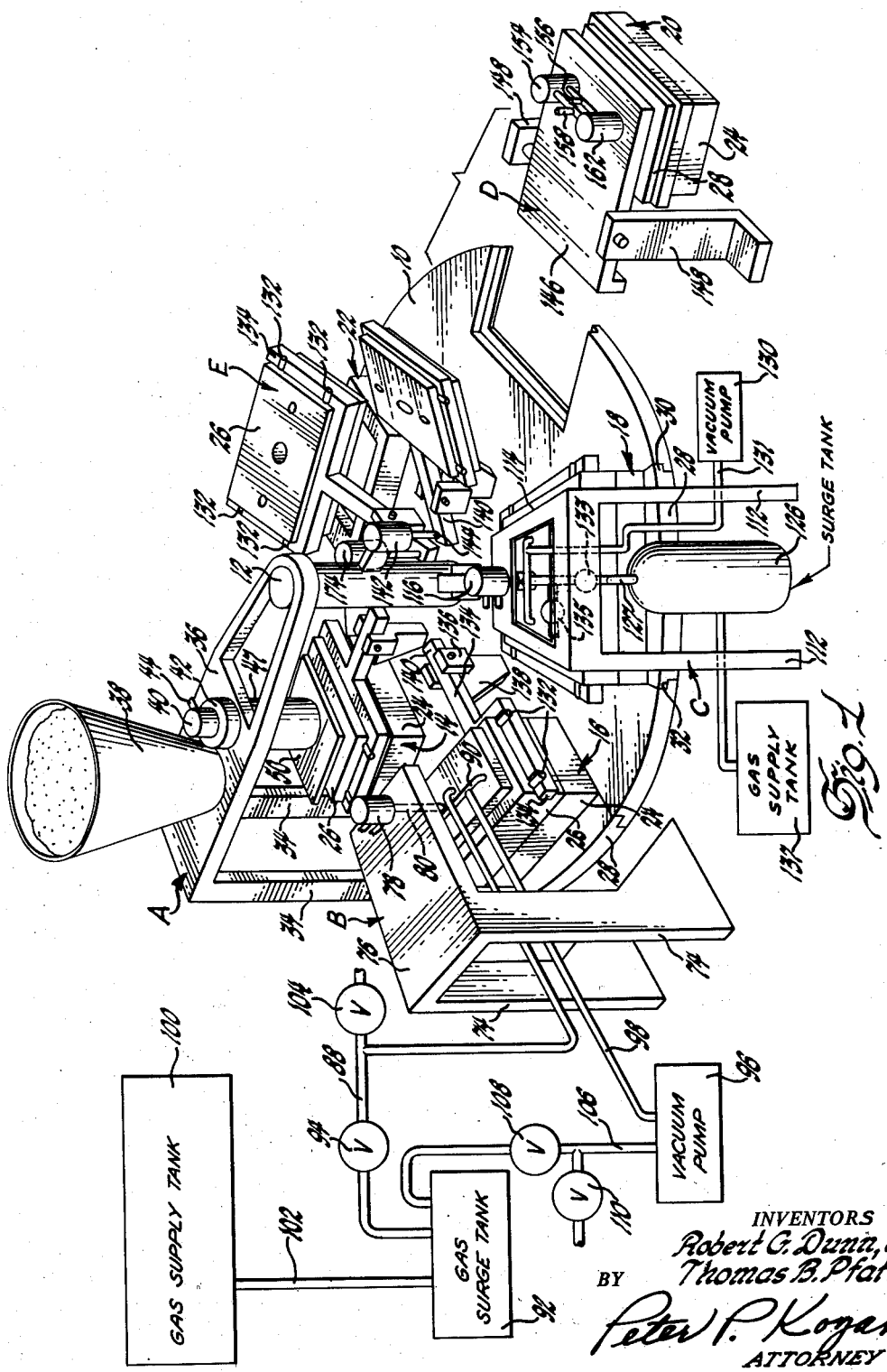
FIGURE 1 is a perspective view of apparatus embodying the invention showing five processing stations.
Figure 2:
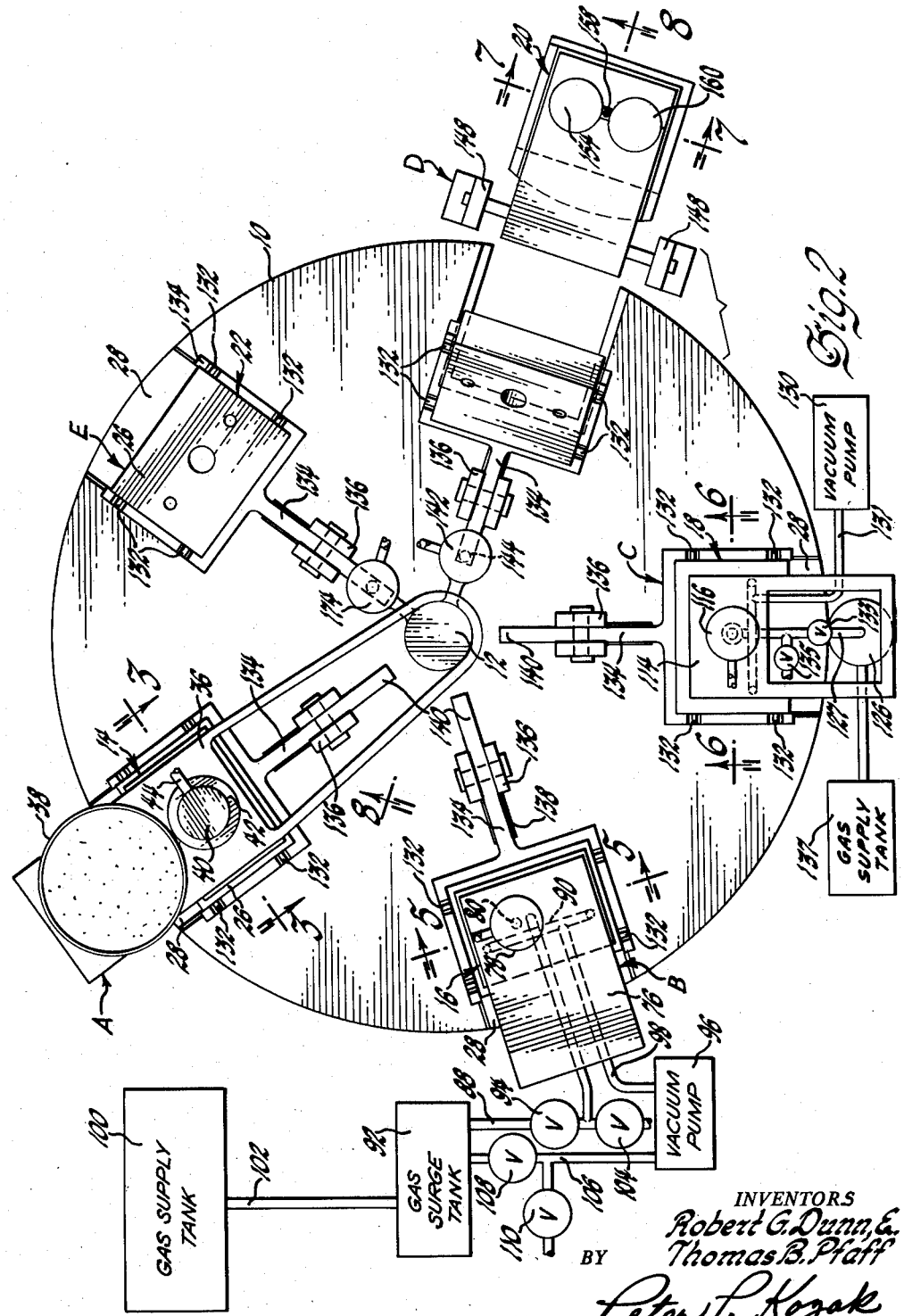
FIGURE 2 is a plan view of the apparatus shown in FIGURE 1.

Referring now to the drawings, the apparatus of the present invention is shown in a general manner in FIGURES 1 and 2. It includes five processing stations disposed in equally spaced relation about a rotatable table 10, consisting of a sand-resin blowing station A, a gasifying station B, a gas purge and neutralizing station C, a core ejection station D and a cleaning station E.

Figure 3:
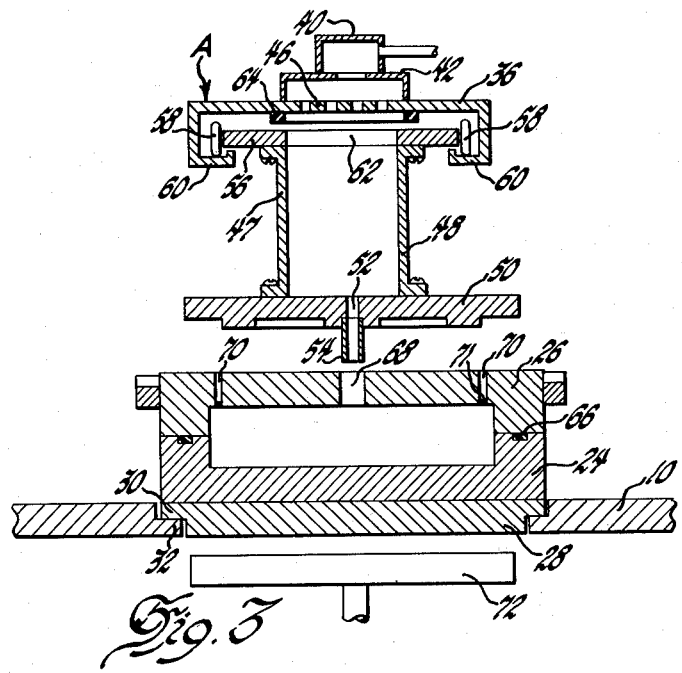
FIGURE 3 is a cross sectional view with parts broken away taken along line 3—3 of FIGURE 2 showing a core box mounted on a rotatable table and a blowhead in a position spaced from the core box.

The table 10 is mounted rotatably on a vertical stationary shaft 12 and is power driven for rotational movement in a manner to be described hereinafter. Mounted on the table 10 are five identical core boxes 14, 16, 18, 20 and 22. Each of these core boxes consists of a lower or drag portion 24 and an upper or cope portion 26 as is indicated in connection with station A of FIGURE 1 and is more clearly shown in FIGURE 3. The drag portion 24 of the core box is securely attached to an upwardly movable segment 28 of the table 10 in a manner to be subsequently described in connection with FIGURES 7 and 8. The segments 28, as shown in FIGURE 3, are supported on the table 10 by means of flange or shoulder portions 30 engaging recessed shoulders 32 of the table in a well known manner whereby these segments may be raised from the table by a support acting from beneath the table. These core boxes will be hereinafter described in greater detail. As is readily apparent from FIGURES 1 and 2, the core boxes are equally spaced from one another both circumferentially and radially in a manner such that when one of the core boxes is in an operative position in one of these stations, the other core boxes are in an operative position in the other stations, and each core box may be moved simultaneously to the following station in predetermined intervals of time.

Figure 4:
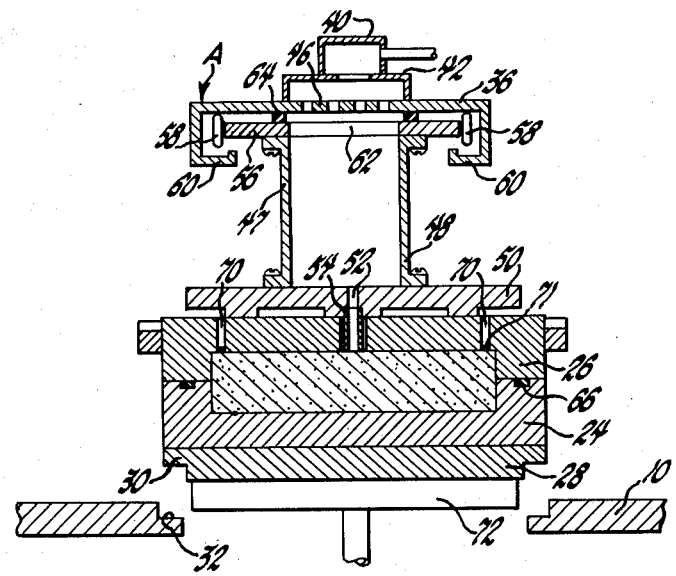
FIGURE 4 is a view similar to that of FIGURE 3 with parts positioned in an operating condition.

In general the station A consists of means for filling the core box cavity with an acid gas curable sand-resin mixture to form an uncured core which is shown in greater detail in FIGURES 3 and 4. The station B consists of means for forcing an acid gas catalyst into the uncured core within the core box cavity which is shown in greater detail in FIGURES 5 and 9. The station C consists of means for neutralizing the residual gas after the core has been cured at the gasifying station B, as shown in greater detail in FIGURE 6. The station D consists of means for ejecting the cured core from the core box and which is shown more clearly in FIGURES 7 and 8. Station E is merely a position at which the core boxes may be examined and cleaned before being advanced to the initial station A of the core making cycle. As will be apparent from the following description, in operation, the table 10 is indexed in a manner such that at appropriate intervals of time, each core box is advanced through each of the successive stations A, B, C, D and E whereby the core is automatically formed in a rapid and efficient manner.

The Sand-Resin Blowing Station A

As shown in FIGURES 1, 2 and 3, the station A includes an angular support member having vertical base portions 34 and a horizontal support portion 36 supported on the stationary shaft 12. Mounted on the horizontal support member 36 is a sand-resin magazine 38 having the mouth thereof extending through the horizontal support member 36. Spaced from the magazine 38 is a blowhead portion 40 as shown in FIGURE 3 consisting of an air manifold portion 42 connected to a source of air pressure by means of the conduit 44, mounted over a perforated portion 46 of the horizontal support 36. Also forming a portion of the blowhead is a movable portion 47 which consists of a cylindrical portion 48 to which is bolted a base plate 50 having a centrally disposed opening 52 therethrough and a downwardly extending tube or nozzle 54 which forms an extension of the opening 52. The top of the cylindrical portion 48 is bolted to a flat plate 56 having rollers 58 rotatably mounted on opposite sides thereof which run in U-shaped channels 60 formed in the sides of the support 36. The upper plate 56 is provided with an opening 62 therein which is co-extensive with the opening of the cylindrical member 48. Fastened to the underside of the horizontal member 36 and surrounding the apertured portion 46 thereof is a gasket 64 of suitable material such as rubber.

The core box cope 26 is hermetically sealed with respect to the lower portion 24 by means of a gasket 66 and is provided with a centrally disposed opening 68 therethrough of a size adapted to snugly receive the extending blow tube or nozzle 54 entirely along the length of the opening 68. Vent openings 70 are also provided at the opposed sides of the core box to provide an efficient path for the movement of gases from the center toward the sides of the core box cavity.

Beneath the table 10 is provided a power driven, vertically movable platform 72 which is positioned directly below the blowhead 40 and is of a size such that when the table is indexed so as to place a segment 28 of the table 10 with its core box in position at the station A, the platform 72 may be raised to elevate the segment 28 from the table 10 as shown in FIGURE 4.

The operation of the station A is as follows. The cylindrical blowhead portion 48 is filled with a sand-resin mix from the sand-resin magazine 38. This is accomplished by moving the movable blowhead portion beneath the mouth of the magazine 38 in a manner such that the opening 62 thereof is in line with the mouth of the hopper. The mouth of the blowhead of the magazine 38 is provided with suitable metering means (not shown) for depositing a predetermined quantity of the sand-resin mix into the movable portion of the blowhead. After the movable blowhead portion 47 has been filled with the sand-resin mixture, is is moved into position beneath the perforated portion 36 of the blowhead.

Thereafter the core box is raised by means of the platform 72 whereby the blowhead nozzle 54 is caused to extend entirely through the opening 68 of the upper core box half 26. A further elevation of the core box causes the movable portion 47 of the blowhead to be raised into sealing contact with the gasket 64. Squeezing these parts together effects a tight seal between the core box parts 24 and 26. As is shown in FIGURE 4, at this time air pressure is applied to the stationary blowhead portion 40 to cause the sand-resin mix within the blowhead portion 47 to be blown into the core box cavity. It will be noted that with this arrangement, after removal of the nozzle 54 from the core box opening 68, no residual sand-resin mix is retained in the opening 68 and the vents 70 which are provided with filter plugs 71 prevent admission of the sand-resin mix thereto. After the segment 28 has been lowered into its position on the table 10, the table is indexed to move the filled core box to the gasifying station B.

The Gasifying Station B

Figure 5:
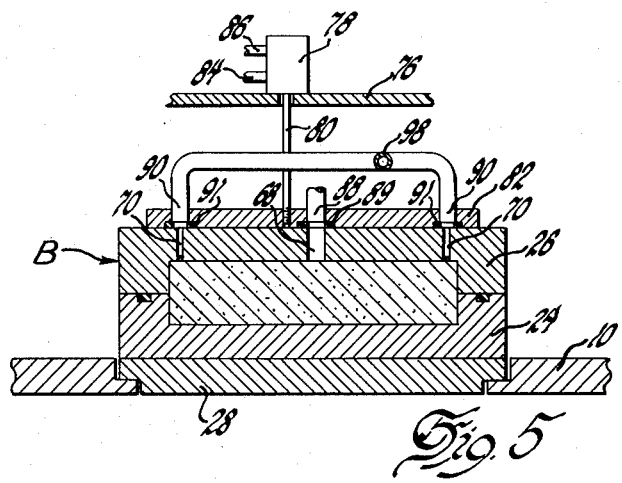
FIGURE 5 is a cross sectional view with parts broken away taken along line 5—5 of FIGURE 2 showing the gasifying station with the parts in an operating condition.

As shown in FIGURES 1, 2, 5 and 9, the gasifying station B includes an angular support consisting of a base portion 74 and a horizontal support portion 76. The horizontal member 76 supports a hydraulic cylinder 78 of a conventional design having a vertically reciprocable piston therein attached to a piston rod 80 which in turn is attached to a plate 82. The conduits 84 and 86 admit hydraulic fluid to the upper and underside of the piston so that a variation of pressure in these conduits causes the piston to move the plate 82 vertically in a well known manner. The plate 82 includes a centrally disposed intake conduit 88 arranged to be in registry with the opening 68 of the upper core box portion 26, and the exhaust conduits 90 are arranged to be in registry with the vents 70 of the core box when the core box is in its operating position at station B. As shown in FIGURE 5, the gaskets 89 and 91 are associated with the openings 88 and 90 of the plate 82 respectively to provide a seal between the plate 82 and the core box portion 26 when the plate is in engagement with the core box portion 26. In an operative position the downward pressure of the plate 82 is sufficient to maintain an effective seal between the parts during the gasifying operation.

Figure 9:
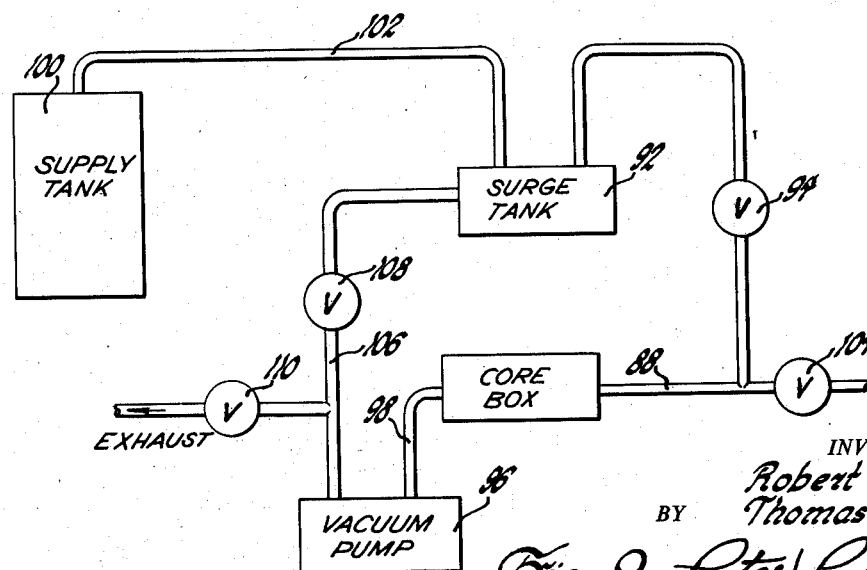
FIGURE 9 is a schematic view of the arrangement for supplying an acid gas to the gasifying station shown in FIGURE 5.

As is shown schematically in FIGURE 9, the acid gas intake conduit 88 is connected to a surge tank 92 through a valve 94 and vented to the atmosphere through the valve 104. The exhaust openings 90 are connected to the intake side of a vacuum pump 96 through a common conduit 98. The surge tank 92 is connected to an acid gas supply tank 100 by means of a conduit 102. The supply tank 100 contains an acid gas under a suitable pressure of about 10 pounds per square inch gauge. The exhaust side of the vacuum pump 96 is connected to the surge tank 92 by means of a conduit 106 through a valve 108. The conduit 106 is vented to the atmosphere or to a suitable acid gas absorption means such as a water tank through the valve 110, disposed in the conduit 106 between the vacuum pump and the valve 108.

The operation of the gasifying station B is as follows. As the table 10 is indexed and the sand-resin filled core box is moved from the station A to an operating position in station B, the plate 82 thereof is in a position spaced from the core box. Thereafter the plate 82 is lowered into contact with the upper core box portion 26 as a result of which the acid gas intake conduit 88 of the plate 82 is in registry with the opening 68 of the core box and the exhaust conduits 90 of the plate 82 are in registry with the vents 70 of the core box. At this time, the valves 94, 104 and 108 are closed, the valve 110 is open, and the vacuum pump 96 is in operation. The pressure in the surge tank is maintained at about 10 pounds per inch gauge of the supply tank 100. As a result the air is evacuated from the sand-resin material within the core box within a few seconds. Next the valve 110 is closed and the valves 94 and 108 are opened. As a result, the acid gas recycles through the core box cavity and the core therein for about 3 to 4 seconds. Thereupon, the valves 104 and 94 are closed as a result of which the acid gas is withdrawn from the core box cavity and core and pumped into the surge tank 92 in a few seconds. Finally, the valve 108 is closed, the exhaust valve 110 and vent valve 104 are opened, the plate 82 is raised from the core box and the table 10 is indexed to move the gasified core box to the next acid gas neutralizing station C. Desirably this entire operation is performed within about 10 seconds.

The Neutralizing Station C

Figure 6:
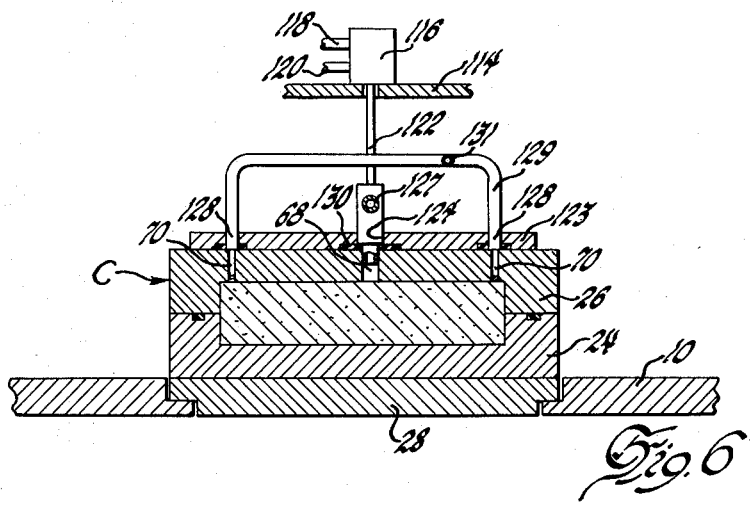
FIGURE 6 is a cross sectional view with parts broken away of the purge and neutralizing station taken along line 6—6 of FIGURE 2 shown in an operating position.

The neutralizing station C also includes an angular support including vertical support members 112 and a horizontal support member 114. On the horizontal support member 114 is mounted a hydraulic cylinder 116 containing a vertically reciprocable piston which as in the case of the cylinder 78 of FIGURE 5 may be caused to reciprocate in response to a variation of pressure in the conduits 118 and 120 leading to spaces in the cylinder above and below the pistons, respectively. Attached to the piston within the cylinder 116 is a connecting rod 122. The opposite end of the connecting rod 122 is attached to a plate 123 which may be moved from a position spaced from the core box to a position in contact with the core box as shown in FIGURE 6. An opening 124 centrally disposed in the plate 123 is connected to a surge tank 126 (FIGURE 1) by means of a flexible conduit 127 including two valves 133 and 135. The surge tank 126 is connected to a neutralizing gas supply tank 137 maintained at a pressure of about 10 pounds per square inch gauge. The opening 124 is in registry with the opening 68 of the core box as shown in FIGURE 6 when the plate 123 is in position on the core box. The plate 123 also includes openings 128 which are in registry with the vents 70 of the core box when the plate 123 is in position on the core box. The openings 128 are connected to a vacuum pump 130 by means of a conduit 129 and a flexible conduit 131.

The operation of the neutralizing station C is as follows. When the core box containing the gasified and cured core is advanced to the neutralizing station C, the plate 123 is in a raised position. After the core box is in position at the station C, the plate 123 is lowered into engagement with the core box by means of the hydraulic cylinder 116. The downward pressure exerted by the hydraulic piston gaskets associated with the plate 123 openings to effect a seal between the plate 123 and the core box. At this time, the vacuum pump 130 is in operation, the valve 133 is closed and the valve 135 is open so that air is drawn through the core box cavity and core for a few seconds. Thereafter the valve 135 is closed and the valve 133 is opened to permit the neutralizing gas to be drawn through the core box cavity and core for about 2 seconds. The valve 133 is then closed and the vent valve 135 is opened to enable the vacuum pump to draw air through the core box to thereby purge the core of the neutralizing gas. The vacuum pump exhausts the neutralizing gas to the atmosphere or to a suitable receptacle such as a water tank so that the apparatus is operated without discharging deleterious gases to the working spaces. The plate 123 is then raised and the table 10 is indexed to move the core box to the core ejection station D.

The Core Ejection Station D

The core ejection station consists essentially of mechanism for removing the upper core box half from the lower core box half, turning the lower core box half in an inverted position and means for freeing the core from the cavity of the lower core box portion.

As shown in FIGURE 1, particularly at station B, the upper core box half 26 is provided with a pair of lugs or projections 132 on each side thereof which normally rest in grooves cut into the arms of a yoke or fork member 134 positioned beneath the lugs 132. The fork member 134 is pivotally mounted on a support member 136 attached to the table 10. The support 136 is provided with an abutment 138 which supports the yoke 134 in a horizontal position. In this horizontal position the yoke 134 permits the core box portion 26 to rest on the lower core box portion 24 in sealing engagement. The yoke 134 is provided with a portion 140 extending substantially beyond the point at which the yoke 134 is pivoted to the support member 136 so that when downward pressure is imposed on the extension 140, the support 136 acts as a fulcrum and the yoke 134 is operative to raise the core box portion 26 from the lower core box portion 24 in an obvious manner.

At station D a hydraulic cylinder 142 is attached to the shaft 12. A shaft or connecting rod 144 connected to a piston within the cylinder 142 is utilized to impose a downward force on the yoke extension 140 to raise the core box half 26 from the lower core box half 24 as above-described.

Figure 8:
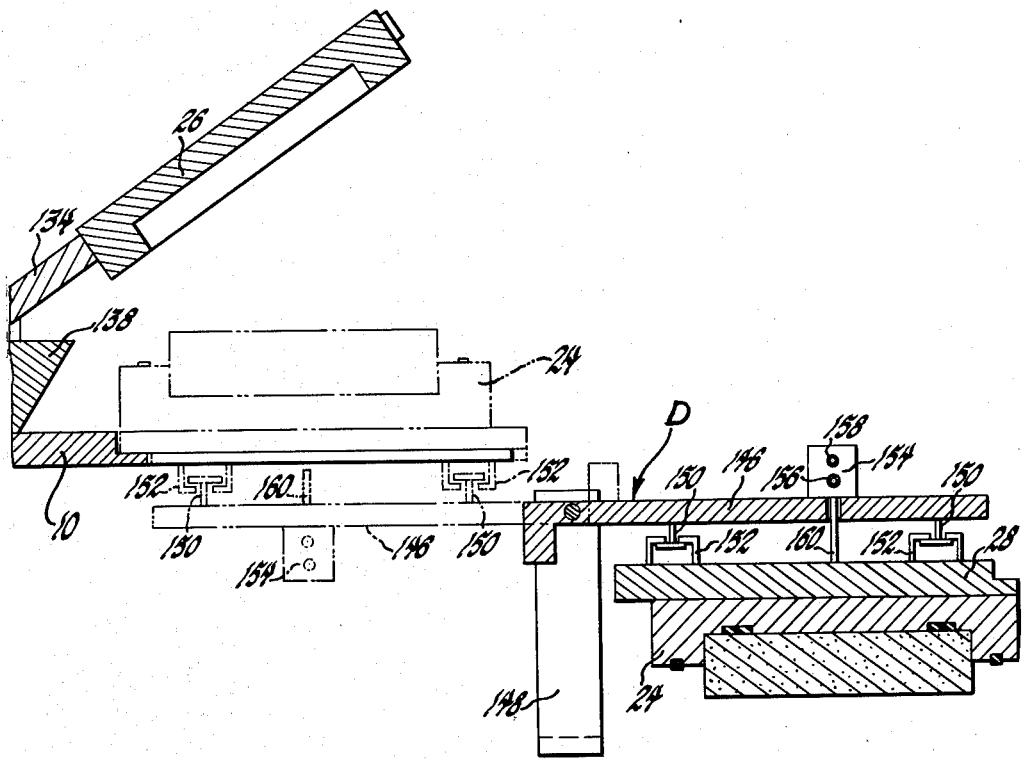
FIGURE 8 is a cross sectional view with parts broken away taken along line 8—8 of FIGURE 2 showing the roll-over core ejection station in a rolled over position.

FIGURES 1, 2 and 8 show the station D after the core box half 26 has been raised and the lower core box half 24 has been inverted. The mechanism for performing this function is shown in solid lines after the lower core box half has been inverted and in broken lines before the inverting operation. It includes a plate 146 pivotally mounted between spaced vertical supports 148. In its normal horizontal position as indicated by the broken lines, it is maintained in a horizontal position by a support member or table (not shown) disposed beneath the plate 146. The pivotal movement of the plate 146 is effected by a conventional power means which has not been shown for the sake of simplicity.

The plate 146 carries a pair of T shaped dogs 150 adapted to slide between partially closed U shaped brackets 152 fastened to the segment 28 of the table 10 as the table 10 is indexed so as to move the core box from the station C to the station D. As shown in FIGURE 8, the dogs 150 and brackets 152 are capable of supporting the segments 28 and the lower core box half 24 in an inverted position as shown. A hydraulically operated piston 154 mounted on the plate 146 and having conduits 156 and 158, respectively, for admitting hydraulic fluid to the lower and upper sides of the piston and having a vertically movable rod attached to the piston is operative to cause the rod 160 to press against the normal underside of the segment 28 to insure a tight engagement of the dogs 150 and the brackets 152 and to prevent relative movement between the table segments 28 and the plate 146.

Figure 7:
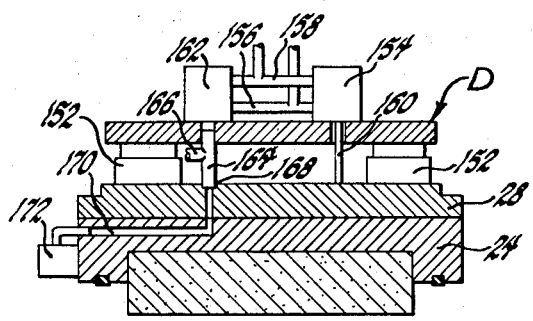
FIGURE 7 is a cross sectional view taken along line 7—7 of FIGURE 2 showing a portion of the roll-over core ejection station in a rolled over position.

As is shown in FIGURE 7, a second hydraulically operated piston 162 also having the conduits 156 and 158 respectively for admitting hydraulic fluid to the lower and upper sides of the piston is mounted on the plate 146 and connected to a hollow piston rod 164. The hollow rod 164 has an inlet conduit 166 for admitting air under pressure to the hollow portions thereof. The end of the piston rod 164 is movable into sealing engagement with an opening 168 of the table 28 which leads to a conduit 170 extending through the core box half 24 which in turn leads to an air-operated vibrator 172 fixed to the side of the core box half 24 as shown in FIGURE 7. The piston 162 and the hollow piston rod 164 serve the dual function of locking the plate 146 with respect to the table segment 28 and of conveying air pressure to the vibrator 172 which is utilized to loosen the core and enable it to drop out of the core box cavity.

The operation of the station D is as follows. As the core box is moved from the neutralizing station C to the core ejection station D, the dogs 150 slide between the bracket members 152 as described above. Next, the hydraulic piston 142 is caused to move the rod 144 downwardly to raise the upper core box portion 26 as shown in FIGURES 1 and 8. Hydraulic pressure is then admitted to the conduits 156 and 158 to cause the piston rods 160 and 164 to bear against the segment 28 to lock the plate 146 with respect to the segment 28. The plate 146 is then rotated through an angle of about 180° to invert the core box as shown in FIGURE 8. Air pressure is admitted to the hollow rod 164 through the conduit 166 to actuate the vibrator 172 and cause the core to drop from the core box cavity. The plate 146 is then moved to its normal position as shown in the broken lines of FIGURE 8. The connecting rods 164 and 160 are withdrawn from contact with the segment 28 and the hydraulic piston 142 is actuated to cause the yoke 134 to place the upper core box portion 26 over the lower core box portion 24 and the table 10 is indexed so as to move the core box to the station E.

Station E consists merely of a hydraulic cylinder 174 which is identical in operation to the hydraulic cylinder 142 of station D. At station E the upper core box portion 26 is merely raised by means of the hydraulic piston 174 to permit the core box cavity to be cleaned before the table 10 is again indexed to move the core box from the station E to the sand-resin filling station A for the commencement of another core making cycle.

The movement of the core boxes through the cycle described above is performed automatically by means of automatic control apparatus which will be apparent to those skilled in the art. This control means has been omitted in the foregoing description for the sake of simplicity and clarity in describing the invention. The station E may of course be omitted if desired. However, the operation at each of the stations A, B, C and D is performed within a time interval of about 10 seconds so that it is preferred to utilize the station E to afford an opportunity for the operator to inspect the condition of the core box after each cycle and perform any necessary cleaning operations.

Various modifications in the arrangement of details of the specific embodiment described and shown herein will be apparent to those skilled in the art and are contemplated as being within the scope of the present invention as defined in the claims appended hereto.

We claim:

1. Apparatus for use in making foundry molds and cores comprising, in combination, a sand-resin blowing station, a gasifying station, an acid gas neutralizing station, a two-part mold having an inlet opening and a vent opening through a wall thereof, conveyor means for supporting and moving said two-part mold successively to a predetermined position at each of said stations, said sand-resin blowing station including a blowhead having an exhaust conduit adapted to extend through said mold inlet opening and be snugly received thereby when said mold is in said predetermined position at said sand-resin blowing station, said gasifying station including a plate adapted to be placed adjacent said wall of said mold, a vacuum source and an acid gas source, conduit means extending from said acid gas source through said plate and adapted to be in communication with said mold inlet opening when said plate is adjacent said wall, conduit means extending from said vacuum source and through said plate adapted to be placed in communication with said mold vent when said plate is adjacent said mold wall, said neutralizing station including a second plate adapted to be moved adjacent to said mold wall, an acid neutralizing gas source and a vacuum source, conduit means extending from said neutralizing gas source and through said second plate and adapted to be placed into communication with said inlet opening when said second plate is adjacent said mold wall and conduit means extending from said vacuum source through said second plate and adapted to be placed in communication with said vent when said second plate is adjacent said wall.

2. A method of making foundry molds and cores comprising the steps of providing a mold having an enclosed cavity, an inlet opening and a vent opening in one plane of the mold, inserting a blowhead exhaust conduit substantially through said inlet opening, blowing an acid gas curable sand-resin mixture into the cavity of said mold to completely fill said cavity and withdrawing said blowhead exhaust conduit from said mold whereby a sand-resin article is formed entirely within the confines of said mold cavity, and filling the said mold cavity, simultaneously connecting the mold inlet opening with a source of acid gas and the vent opening to a vacuum source by means of a plate having openings therein aligned with said inlet and vent openings and being connected to an acid gas and vacuum source respectively, and subjecting the mold cavity to a source of vacuum while injecting an acid gas therein for a time sufficient to cure the sand-resin mixture therein.

3. Apparatus for forming foundry molds and cores comprising, in combination, a two-part mold having a cavity therein and including an intake opening and a vent opening, and circulating means for admitting an acid gas to the mold cavity including a fluid circuit comprising a surge tank, a vacuum pump and the cavity of said mold connected in fluid-flow relationship, said surge tank being connected to said mold cavity intake opening and to the exhaust of said vacuum pump, the intake of said vacuum pump being connected to said mold cavity vent opening, a first valve means connected in said circuit between said surge tank and said vacuum pump, an exhaust valve means connected in said circuit between said first valve means and said vacuum pump, a second valve means connected between said surge tank and said mold cavity, and an acid gas supply tank connected to said surge tank in fluid-flow relationship, said circulating means being operative to evacuate said mold cavity when said first and second valve means are closed and said exhaust valve means is open, said circulating means being operative to circulate the acid gas through said mold cavity when said exhaust valve means is closed and said first and second valve means are open, and said circulating means being operative to return the acid gas to said surge tank when said first valve means is open, said second valve means is closed and said exhaust valve means is closed.

4. A method of making foundry molds and cores comprising the steps of providing an enclosed mold having a mold cavity, an inlet opening and a vent opening on the same side of said mold in a plane, inserting a blowhead exhaust conduit substantially through said inlet opening, blowing an acid gas curable sand-resin mixture into said cavity and withdrawing said blowhead exhaust conduit from said mold whereby a sand-resin article is formed entirely within the confines of said mold cavity and completely filling said mold cavity, withdrawing said exhaust conduit, connecting the mold inlet opening with a source of said acid gas and the vent opening to a vacuum source by means of a plate having openings therein aligned with said inlet and vent openings and being connected to an acid gas and vacuum source respectively, subjecting the mold cavity to a source of vacuum while injecting the acid gas therein for a time sufficient to cure the sand-resin mixture therein, removing said plate from said mold and replacing it with a second plate having openings therein aligned with said inlet opening and said vent and being connected to a source of ammonia gas and a vacuum respectively, and thereafter injecting ammonia gas into said cavity for a time sufficient to neutralize the acid gas therein while subjecting the mold cavity to a source of vacuum.

5. Apparatus for forming foundry molds and cores comprising, in combination, a sand-resin blowing station, a gasifying station, a two-part mold having a cavity therein including an intake opening and a vent opening through a wall thereof and conveyor means for supporting and moving said two-part mold successively to each of said stations, said sand-resin blowing station including a blowhead having a blow tube adapted to be snugly received within said intake opening and to extend substantially therethrough when said mold is at the blowing station, said gasifying station including a plate having an acid gas conduit and a vacuum conduit extending therethrough, said plate being adapted to be placed adjacent said wall of said mold at said gasifying station whereby said gas conduit is connected to said mold intake opening and said vacuum conduit is connected to said vent.

6. Apparatus for forming foundry molds and cores comprising, in combination, a sand-resin blowing station, a gasifying station, an acid neutralizing station, a two-part mold having a cavity therein including an intake opening and a vent opening through a wall thereof and conveyor means for supporting and moving said two-part mold successively to each of said stations, said blowing station including a blowhead having a blow tube adapted to be snugly received within said intake opening and to extend substantially therethrough when said mold is at the blowing station, said gasifying station including a plate having an acid gas conduit and a vacuum conduit extending therethrough, said plate being adapted to be placed adjacent said wall of said mold at said gasifying station whereby said gas conduit is connected to said mold intake opening and said vacuum conduit is connected to said vent, said acid neutralizing station including a second plate having a neutralizing gas conduit and a vacuum conduit extending therethrough, said second plate being adapted to be placed adjacent said wall of the mold at said neutralizing station whereby said neutralizing gas conduit is connected to said mold intake opening and said vacuum conduit is connected to said vent.

7. Apparatus for forming foundry molds and cores comprising, in combination, a sand-resin blowing station, a gasifying station, a two-part mold having a cavity therein including an intake opening and a vent opening through a wall thereof and conveyor means for supporting and moving said two-part mold successively to each of said stations, said blowing station including a blowhead having a blow tube adapted to be snugly received within said intake opening and to extend substantially therethrough when said mold is at said blowing station, said gasifying station including gas circulating means for admitting an acid gas to the mold cavity including a fluid circuit comprising a surge tank, a vacuum pump and the cavity of said mold connected in fluid-flow relationship, said surge tank being connected to said mold cavity intake opening and to the exhaust of said vacuum pump, the intake of said vacuum pump being connected to said mold cavity vent opening, a first valve means connected in said circuit between said surge tank and said vacuum pump, a first exhaust valve means connected in said circuit between said first valve means and said vacuum pump, a second valve means connected between said surge tank and said mold cavity, and a second exhaust valve means connected in said circuit between said second valve means and said mold cavity, and an acid gas supply tank connected to said surge tank in fluid-flow relationship, said circulating means being operative to evacuate said mold cavity when said first and second valve means and said second exhaust valve means are closed and said first exhaust valve means is open, said circulating means being operative to circulate the acid gas through said mold cavity when said first and second exhaust valve means are closed and said first and second valve means are open, said circulating means being operative to return the acid gas to said surge tank when said first valve means is open and said first and second exhaust valve means and said second valve means are closed, and said circulating means being operative to purge said mold cavity when said first and second valve means are closed and said first and second exhaust valve means are open.

8. Apparatus for forming foundry molds and cores comprising, in combination, a sand-resin blowing station, a gasifying station, a two-part mold having a cavity therein including an intake opening and a vent opening through a wall thereof and conveyor means for supporting and moving said two-part mold successively to each of said stations, said gasifying station including gas circulating means for admitting an acid gas to the mold cavity including a fluid circuit comprising a surge tank, a vacuum pump and the cavity of said mold connected in fluid-flow relationship, said surge tank being connected to said mold cavity intake opening and to the exhaust of said vacuum pump, the intake of said vacuum pump being connected to said mold cavity vent opening, a first valve means connected in said circuit between said surge tank and said vacuum pump, an exhaust valve means connected in said circuit between said first valve means and said vacuum pump, a second valve means connected between said surge tank and said mold cavity, and an acid gas supply tank connected to said surge tank in fluid-flow relationship, said circulating means being operative to evacuate said mold cavity when said first and second valve means are closed and said exhaust valve means is open, said circulating means being operative to circulate the acid gas through said mold cavity when said exhaust valve means is closed and said first and second valve means are open, and said circulating means being operative to return the acid gas to said surge tank when said first valve means is open, said second valve means is closed and said exhaust valve means is closed.

References Cited in the file of this patent

UNITED STATES PATENTS

| | | |
|---|---|---|
| 318,784 | Moore | May 26, 1885 |
| 2,545,944 | Ellms | Mar. 20, 1951 |
| 2,791,012 | Miller | May 7, 1957 |
| 2,806,269 | Dunlop | Sept. 17, 1957 |
| 2,824,345 | Zifferer | Feb. 25, 1958 |
| 2,864,134 | Harrison | Dec. 16, 1958 |
| 2,874,428 | Bonney | Feb. 24, 1959 |
| 2,899,724 | Peterson | Aug. 18, 1959 |
| 3,008,205 | Blaies | Nov. 14, 1961 |

FOREIGN PATENTS

| | | |
|---|---|---|
| 209,228 | Australia | July 4, 1957 |
| 780,039 | Great Britain | July 31, 1957 |